United States Patent
James et al.

(10) Patent No.: US 6,414,971 B1
(45) Date of Patent: Jul. 2, 2002

(54) SYSTEM AND METHOD FOR DELIVERING DATA PACKETS IN AN ELECTRONIC INTERCONNECT

(75) Inventors: David V James, Palo Alto; Glen D. Stone, Los Gatos, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/494,753

(22) Filed: Jan. 31, 2000

(51) Int. Cl.[7] .................................................. H04J 3/06
(52) U.S. Cl. ........................ 370/519; 370/486; 370/386; 725/74
(58) Field of Search ...................... 710/113, 52; 381/77; 713/324, 203; 364/400.01; 370/535, 412, 395.64, 395, 516, 468, 386, 389, 252, 487, 486, 519, 521; 375/372; 348/17, 192; 725/74, 105, 151

(56) References Cited

U.S. PATENT DOCUMENTS

| | | | |
|---|---|---|---|
| 5,640,388 A | * 6/1997 | Woodhead et al. | 370/468 |
| 5,675,739 A | 10/1997 | Eilert et al. | 709/226 |
| 5,778,218 A | * 7/1998 | Gulick | 713/203 |
| 5,966,387 A | * 10/1999 | Cloutier | 370/516 |
| 6,061,411 A | * 5/2000 | Wooten | 375/372 |
| 6,064,676 A | * 5/2000 | Slattery et al. | 370/412 |

OTHER PUBLICATIONS

*Automatic Control Systems* by Benjamin C. Kuo, 1982, pp. 471–483.

* cited by examiner

Primary Examiner—Hassan Kizou
Assistant Examiner—John Pezzlo
(74) Attorney, Agent, or Firm—Greogory J. Koerner; Simon & Koerner LLP

(57) ABSTRACT

A system and method for delivering data packets in an electronic interconnect comprises a talker device that transmits one or more data packets over a transmission path to a listener device through one or more bus bridges that each couple adjacent busses in the electronic interconnect. Each data packet includes a time stamp that indicates when the corresponding data packet is scheduled for presentation to the listener device. An initial bus bridge preferably creates a marker packet that is propagated through the transmission path to record delay information corresponding to delay elements such as the intervening bus bridges. A final bus bridge may then utilize the delay information from the marker packet to update the time stamps of the data packets to thereby incorporate the total propagation delay of the transmission path.

42 Claims, 9 Drawing Sheets

SYSTEM AND METHOD FOR DELIVERING DATA PACKETS IN AN ELECTRONIC INTERCONNECT

BACKGROUND

1. Field of the Invention

This invention relates generally to techniques for performing data transfer operations, and relates more particularly to a system and method for delivering data packets in an electronic interconnect.

2. Description of the Background Art

Implementing effective methods for transferring data in an electronic interconnect is a significant consideration for designers and manufacturers of contemporary electronic devices. An electronic device in an electronic interconnect may advantageously communicate with other electronic devices in the interconnect to share data, and thereby substantially increase the capabilities and versatility of individual devices in the electronic interconnect. For example, an electronic interconnect may be implemented in a home environment to enable flexible and beneficial sharing of data between various consumer electronic devices, such as personal computers, digital video disc (DVD) devices, digital set-top boxes for digital broadcasting, enhanced television sets, and audio reproduction systems.

Effectively managing data transfer operations in an interconnect of electronic devices may create substantial challenges for designers of electronic interconnects. For example, enhanced demands for increased device functionality and performance during data transfer operations may require more system processing power and require additional hardware resources across the interconnect. An increase in processing or hardware requirements may also result in a corresponding detrimental economic impact due to increased production costs and operational inefficiencies.

Interconnect size is also a factor that affects the management of data transfer operations in an electronic interconnect. Communications in an electronic interconnect typically become more complex as the number of individual devices or nodes increases. Assume that a particular device on an electronic interconnect is defined as a local device with local software elements, and other devices on the electronic interconnect are defined as remote devices with remote software elements. Accordingly, a local software module on the local device may need to transfer data to various remote software elements on remote devices across the electronic interconnect. However, successfully managing a substantial number of electronic devices across an interconnect may provide significant benefits to a system user.

Furthermore, enhanced device capability to perform various advanced data transfer operations may provide additional benefits to a system user, but may also place increased demands on the control and management of the various devices in the electronic interconnect. For example, an enhanced electronic interconnect that effectively accesses, processes, and displays digital television programming may benefit from efficient interconnect communication techniques because of the large amount and complexity of the digital data involved.

One type of data transfer that may occur in an electronic interconnect is an isochronous data transfer. Isochronous data transfers include the guaranteed handling of data that arrives in a time-based stream that is referenced to regular intervals called cycles. Isochronous data transfers are typically used for time-sensitive applications. For example, video or audio data being transmitted across an interconnect typically needs to arrive at a display device in an uninterrupted flow with appropriate timing. Because of the need for predictable and deterministic behavior when transferring isochronous data, a fixed propagation delay and knowledge of that fixed delay typically become a significant factors.

Due to growing demands on system resources and substantially increasing data magnitudes, it is apparent that developing new and effective methods for transferring data is a matter of importance for the related electronic technologies. Therefore, for all the foregoing reasons, implementing effective methods for transferring isochronous data remains a significant consideration for designers, manufacturers, and users of contemporary electronic devices.

SUMMARY

In accordance with the present invention, a system and method are disclosed for delivering data packets in an electronic interconnect. In one embodiment of the present invention, a connection manager in a controller device preferably initially communicates with various devices on the interconnect to set-up and control a transmission of one or more isochronous data packets.

In one embodiment, a talker device preferably transmits a data packet and corresponding time stamp over a transmission path to a listener device through one or more bus bridges that each couple adjacent busses in the electronic interconnect. Each of the bus bridges typically has a finite propagation delay. In practice, the talker device preferably transmits the data packet with the time stamp to an initial bridge A in the transmission path from the talker to a listener.

A timestamp handler in bridge A preferably performs an initial packet handling procedure by creating a marker packet that is preferably transmitted along the same transmission path as the foregoing one or more data packets. Marker information in the marker packet may include any relevant information to determine the total transmission-path delay, which may then be utilized to perform a single efficient time-stamp recalculation process at a final delay element in the transmission path.

After the creation of the marker packet, bridge A preferably transmits the data packet and the marker packet to an intermediate bridge B for intermediate packet handling procedures. In response, a timestamp handler of bridge B preferably handles the marker information of the marker packet in a manner that preferably depends on whether all the busses on the interconnect are synchronized or non-synchronized.

Bridge B then transmits the data packet and marker packet to a final bridge C in the transmission path. In response, bridge C preferably performs packet handling procedures that are similar to those performed above by intermediate bridge B to update delay information in the marker packet. Bridge C then may perform a final packet handling procedure by preferably determining a total transmission-path delay value that is based on the final version of the marker information.

Finally, bridge C preferably recalculates the time stamp to produce an adjusted time stamp value by adding the total transmission-path delay value to the original time stamp. The listener device may then accurately access and utilize the data packet precisely at the moment indicated by the adjusted time stamp value, in accordance with the present invention.

The foregoing embodiment is discussed in the context of four busses that are connected by a three bridges, where the data transmission is between a single talker and a single listener. However, the present invention is contemplated for use in interconnects comprising any desired number of busses, talkers, and/or listeners that are configured in any desired manner. The present invention therefore effectively and efficiently delivers data packets in an electronic interconnect.

DETAILED DESCRIPTION

The present invention relates to an improvement in data transfer operations. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for delivering data packets in an electronic interconnect, and includes a talker device that transmits one or more data packets over a transmission path to a listener device through one or more bus bridges that each couple adjacent busses in the electronic interconnect. Each data packet includes a time stamp that indicates when the corresponding data packet is scheduled for presentation to the listener device. An initial bus bridge preferably creates a marker packet that is propagated through the transmission path to record delay information corresponding to delay elements such as the intervening bus bridges. A final bus bridge may then utilize the delay information from the marker packet to update the time stamps of the data packets to thereby incorporate the total propagation delay of the transmission path.

Figure 1:
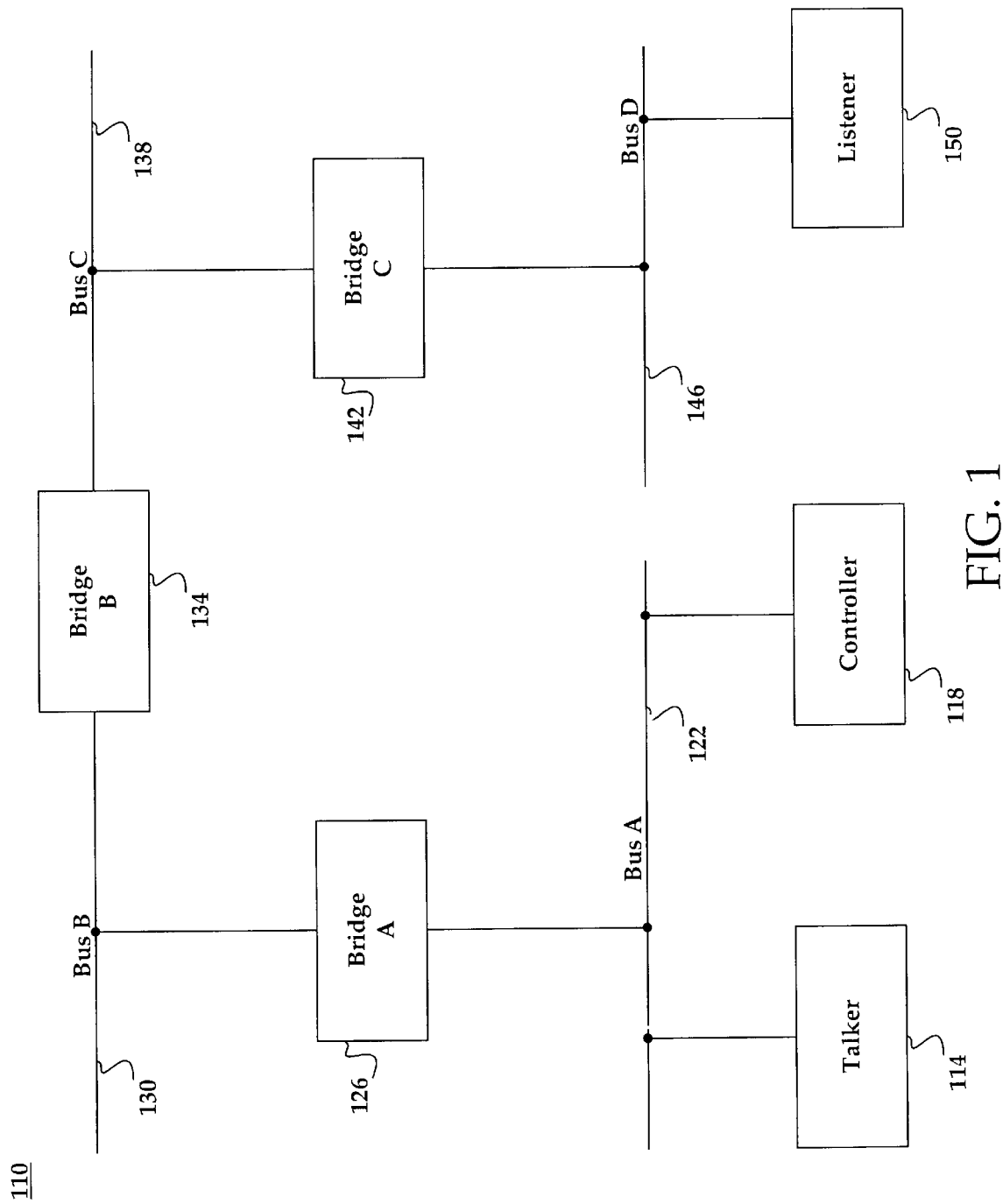
FIG. 1 is a diagram for one embodiment of an electronic interconnect, in accordance with the present invention.

Referring now to FIG. 1, a diagram for one embodiment of an electronic interconnect 110 is shown, in accordance with the present invention. In the FIG. 1 embodiment, interconnect 110 preferably comprises, but is not limited to, a talker 114 and a controller 118 on a bus A 122, a bridge A 126, a bus B 130, a bridge B 134, a bus C 138, a bridge C 142, and a listener 150 on a bus D 146. In alternate embodiments, interconnect 110 may readily be configured to include various other devices or components that function in addition to, or instead of, those discussed in conjunction with the FIG. 1 embodiment. Similarly, in alternate embodiments, interconnect 110 may readily be connected and configured in any other appropriate and suitable manner.

In the FIG. 1 embodiment, the devices (talker 114, controller 118, or listener 150) of interconnect 110 may be implemented as any type of electronic device, including, but not limited to, personal computers, printers,. digital video disc devices, television sets, audio systems, video cassette recorders, memory devices, and various consumer electronics devices. In addition, in the FIG. 1 embodiment, interconnect 110 is preferably implemented in accordance with an IEEE Std 1394-1995 Standard for a High Performance Serial Bus, which is hereby incorporated by reference. However, in alternate embodiments, interconnect 110 may readily communicate and function using various other interconnect methodologies which are equally within the scope of the present invention.

In the FIG. 1 embodiment, controller 118 preferably may coordinate and control communications between talker 114 on bus A 122 and listener 150 on bus D 146. In certain embodiments, controller 118 may be implemented as a set-top box device. One implementation of controller 118 is further discussed below in conjunction with FIG. 2. Furthermore, the functionality and utilization of bridges 126, 134, and 142 are further discussed below in conjunction with FIGS. 5 through 9.

Figure 2:
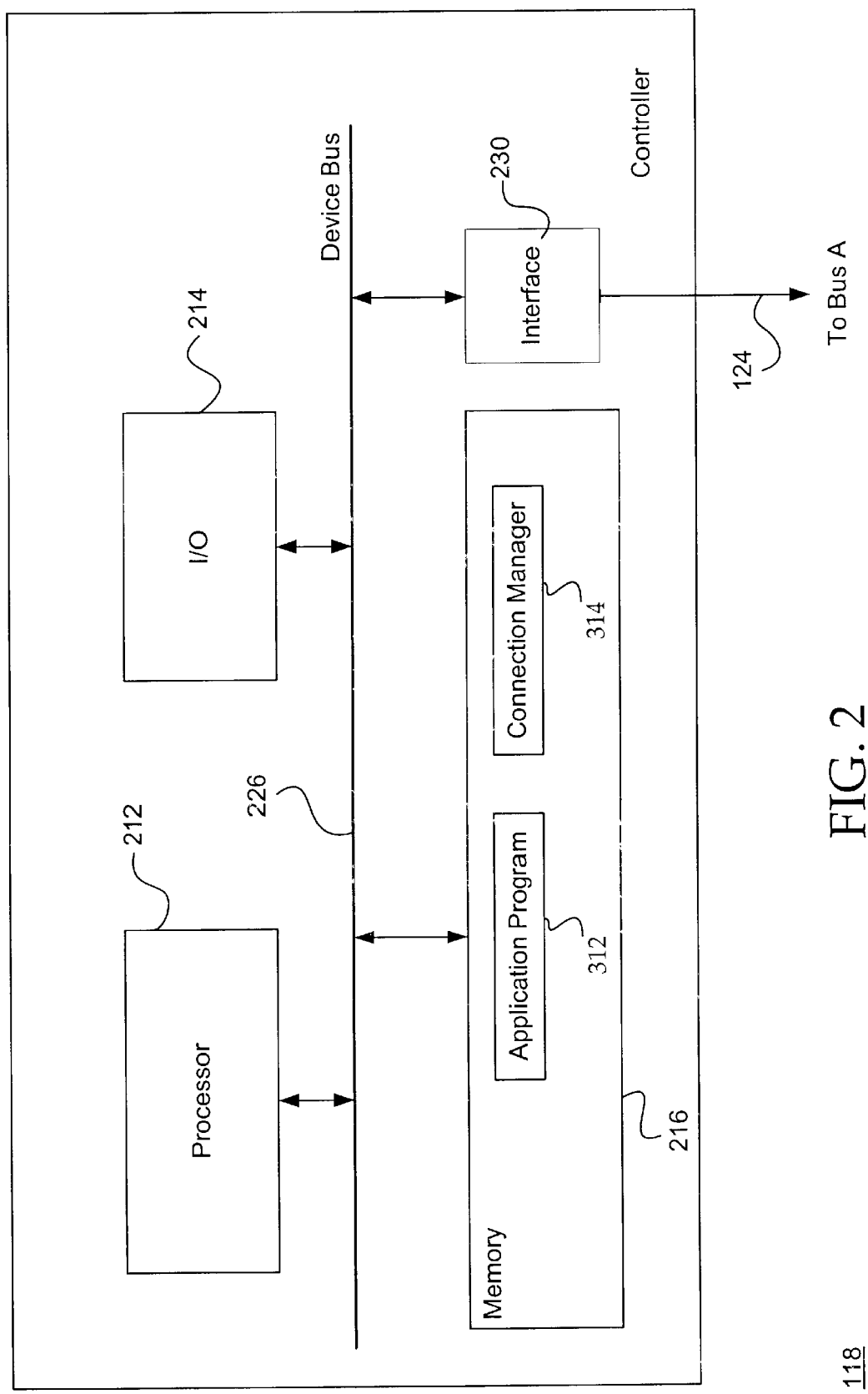
FIG. 2 is a block diagram for one embodiment of the controller of FIG. 1, in accordance with the present invention.

Referring now to FIG. 2, a block diagram for one embodiment of the FIG. 1 controller 118 is shown, in accordance with the present invention. Controller 118 preferably includes, but is not limited to, a processor 212, an input/output (I/O) interface 214, a memory 216, a device bus 226, and an interface 230. Processor 212, I/O interface 214, memory 216, and interface preferably are each coupled to, and communicate via common device bus 226.

In the FIG. 2 embodiment, processor 212 may be implemented as any appropriate multipurpose microprocessor device. I/O interface 214 preferably may provide an interface for communications with various compatible sources and/or destinations, include a user of interconnect 110. Memory 216 may be implemented as one or more appropriate storage devices, including, but not limited to, read-only memory, random-access memory, and various types of non-volatile memory, such as floppy disc devices or hard disc devices.

In the FIG. 2 embodiment, memory 216 preferably includes, but is not limited to, an application program 312 and a connection manager 314. In alternate embodiments, memory 216 may readily include various other components in addition to, or instead of, the components that are discussed in conjunction with the FIG. 2 embodiment. In the FIG. 2 embodiment, application program 312 includes software instructions that are preferably executed by processor 212 for performing various functions and operations by controller 118. The particular nature and functionality of application program 312 preferably varies depending upon factors such as the configuration and implementation of electronic interconnect 110. In accordance with the present invention, controller 118 preferably utilizes connection manager 314 to advantageously control communications on interconnect 110.

Figure 3:
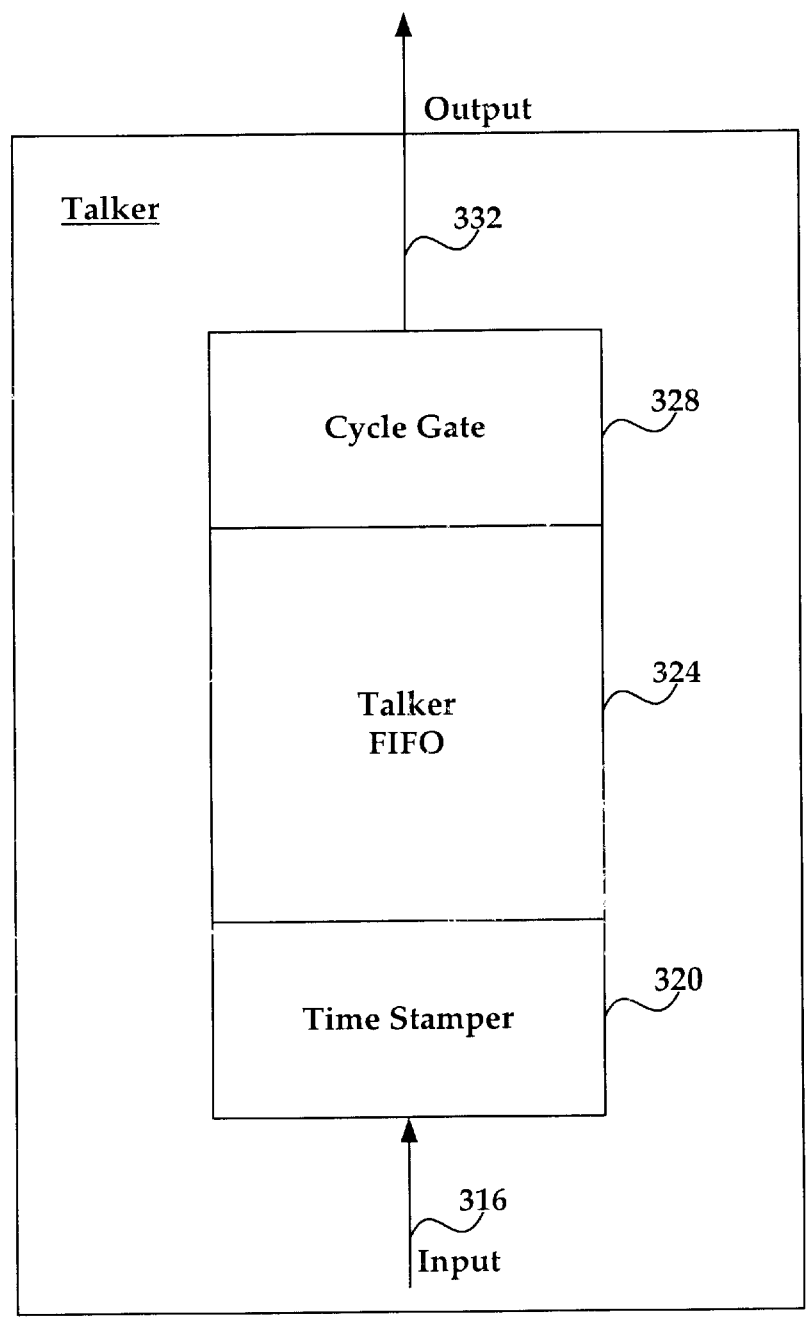
FIG. 3 is a diagram for one embodiment of the talker of FIG. 1, in accordance with the present invention.

Referring now to FIG. 3, a diagram for one embodiment of the FIG. 1 talker 114 is shown, in accordance with the present invention. In the FIG. 3 embodiment, talker 114 includes, but is not limited to, a time stamper 320, a talker first-in-first-out memory (talker FIFO) 324, and a cycle gate 328. For purposes of illustration, the following figures and embodiments discuss a data transmission from talker 114 to listener 150. However, in other embodiments, other talkers may readily communicate with various other listeners in accordance with the present invention.

In the FIG. 3 embodiment, time stamper 320 preferably creates individual presentation timestamps each corresponding to different isochronous data packets received via path 316 to thereby indicate a specific isochronous cycle in which that particular packet is scheduled for use by a designated listener 150. For example, if a given isochronous data packet is received by time stamper 320 at an isochronous cycle number 17, then time stamper 320 may create a presentation time stamp to indicate that the isochronous data packet is scheduled for utilization by listener 150 at a specified isochronous cycle position (such as cycle position 21.5).

In the FIG. 3 embodiment, time stamper 320 may also create a transmission time stamp to indicate the isochronous cycle in which the corresponding data packet is scheduled for transmission from talker A 114. For example, if a given isochronous data packet is received by time stamper 320 at an isochronous cycle number 17, then time stamper 320 may create a transmission time stamp to indicate that the isochronous data packet is scheduled for transmission from talker 114 at a specified isochronous cycle, such as cycle 19.

Time stamper 320 may then temporarily store the time-stamped data packet in talker FIFO 324. In the FIG. 3 embodiment, at the precise transmission time designated in the transmission timestamp, cycle gate 328 preferably transmits the corresponding data packet from talker 114 to bridge A 126 via path 332.

Figure 4:
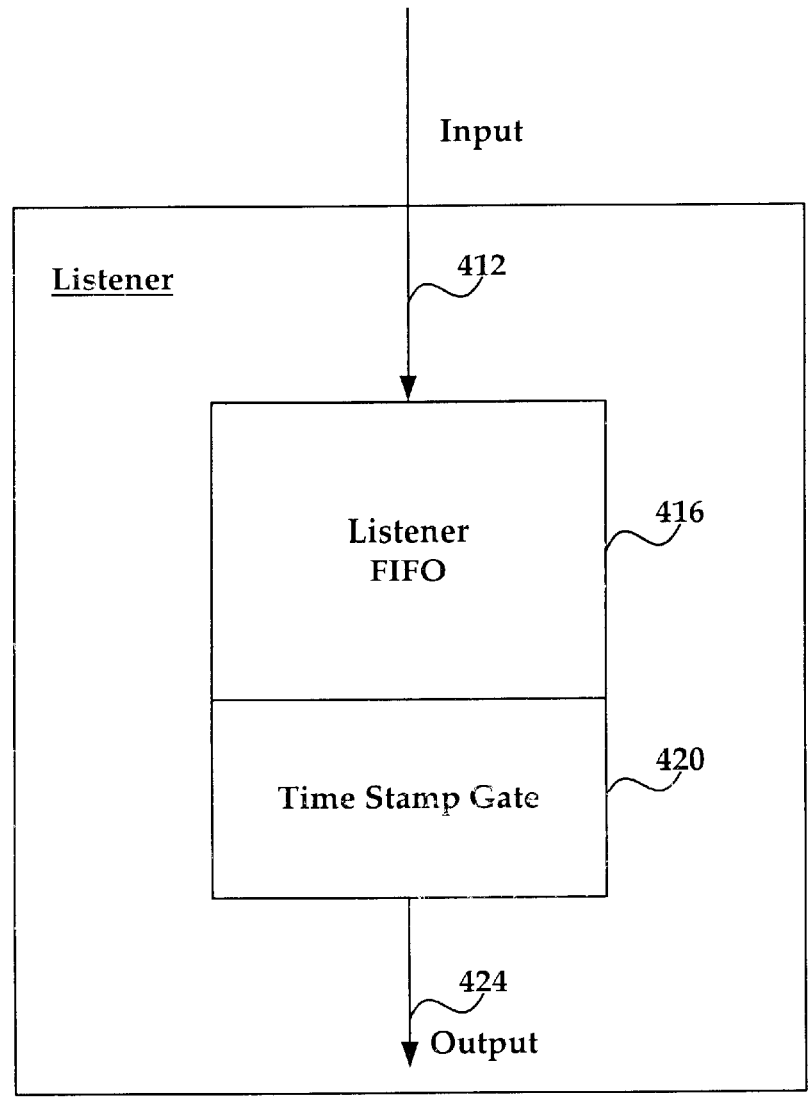
FIG. 4 is a diagram for one embodiment of the listener of FIG. 1, in accordance with the present invention.

Referring now to FIG. 4, a diagram for one embodiment of the FIG. 1 listener 150 is shown, in accordance with the present invention. In the FIG. 4 embodiment, listener 150 includes, but is not limited to, a listener first-in-first-out memory (listener FIFO) 416 and a time stamp gate 420. In the FIG. 4 embodiment, listener FIFO 416 preferably receives isochronous data packets via path 412, and may then temporarily store the time-stamped data packet in listener FIFO 416. In the FIG. 4 embodiment, at the precise presentation time designated in the presentation timestamp, time stamp gate 420 preferably outputs the corresponding data packet from listener FIFO 416 via path 332 for utilization by listener 150 or another appropriate entity in interconnect 110.

Figure 5:
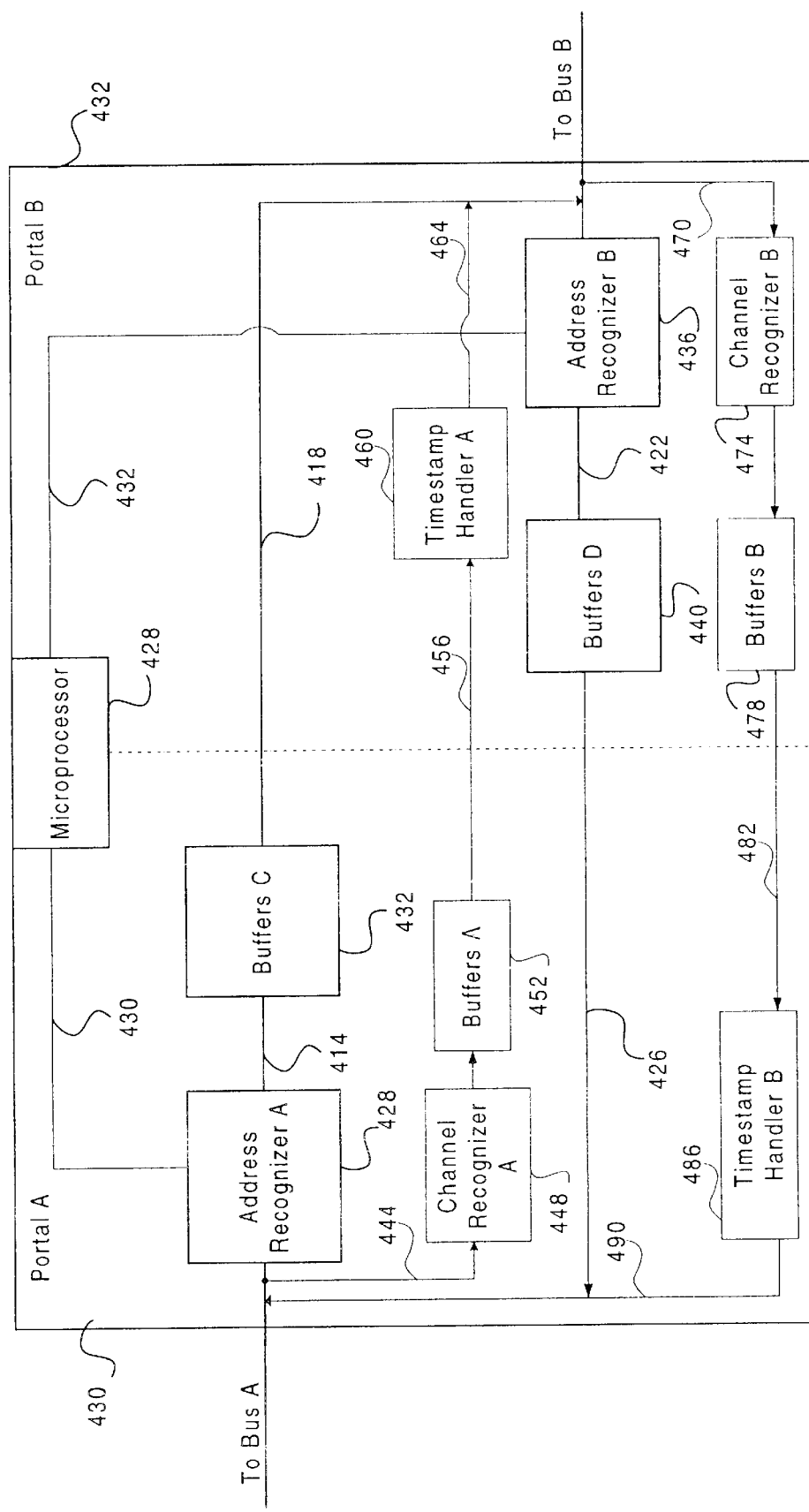
FIG. 5 is a block diagram for one embodiment of a bus bridge of FIG. 1, in accordance with the present invention.

Referring now to FIG. 5, a block diagram for one embodiment of the FIG. 1 bridge A 126 is shown, in accordance with the present invention. In certain embodiments, bridges 134 and 142 of FIG. 1 may also be implemented in accordance with the FIG. 5 embodiment of bridge A 126. In the FIG. 5 embodiment, bridge 126 preferably includes, but is not limited to, a microprocessor 428, an address recognizer A 412, buffers C 432, an address recognizer B 436, and buffers D 440.

In the FIG. 5 embodiment, bridge A 126 preferably also may include a channel recognizer A 448, buffers A 452, a timestamp handler A 460, a channel recognizer B 474, buffers B 478, and a timestamp handler B 486. In alternate embodiments, bridge A 126 may readily be configured to include various other components that function in addition to, or instead of, those discussed in conjunction with the FIG. 5 embodiment. Similarly, in alternate embodiments, components of bridge A 126 may be connected in any other appropriate and effective manner.

In the FIG. 5 embodiment, bridge 126 preferably monitors transmissions on bridged busses, and then selectively forwards the transmissions to an adjacent bus whenever at least one listener for the transmissions exists downstream from the adjacent bus. In practice, in the case of isochronous data packets, channel recognizer A 448 analyzes the isochronous data packets on bus A 122, and responsively determines whether the data packets are directed to the adjacent bus (here, bus B 130). If the foregoing packets are intended for bus B 130, then channel recognizer A 448 temporarily stores the packets into buffers A 452.

In the FIG. 5 embodiment, buffers A 452 preferably store isochronous packets received from channel recognizer A 448 for a period of "N" isochronous cycles to ensure synchronization with other isochronous processes. Buffers A 452 then preferably transmit the stored packets to timestamp handler A 460 via path 456 where the data packets are preferably handled in accordance with the present invention. Timestamp handler A 460 then preferably transmits the data packets to bus B 130 via path 464. Bridge 126 therefore creates a propagation delay in transmissions from bus A 122 to bus B 130. A delay may likewise be caused when a transmission passes through bridge B 134 and/or bridge C 142.

For transmissions in the reverse direction a similar process occurs in which channel recognizer B 432 analyzes packets on bus B 130, and responsively decides whether to forward the packets to the adjacent bus (here, bus A 122). If the foregoing packets are intended for bus A 122, then channel recognizer B 432 temporarily stores the packets into buffers B 478. Timestamp handler B 486 may subsequently handle the data packets in accordance with the present invention before transmitting the packets to bus A 122 via path 490. The functionality and operation of bus bridges is further discussed in "Cumulative Submission To The P1394.1 Committee," by Dr. David V. James, Oct. 12, 1999, IEEE, which is hereby incorporated by reference.

Figure 6:
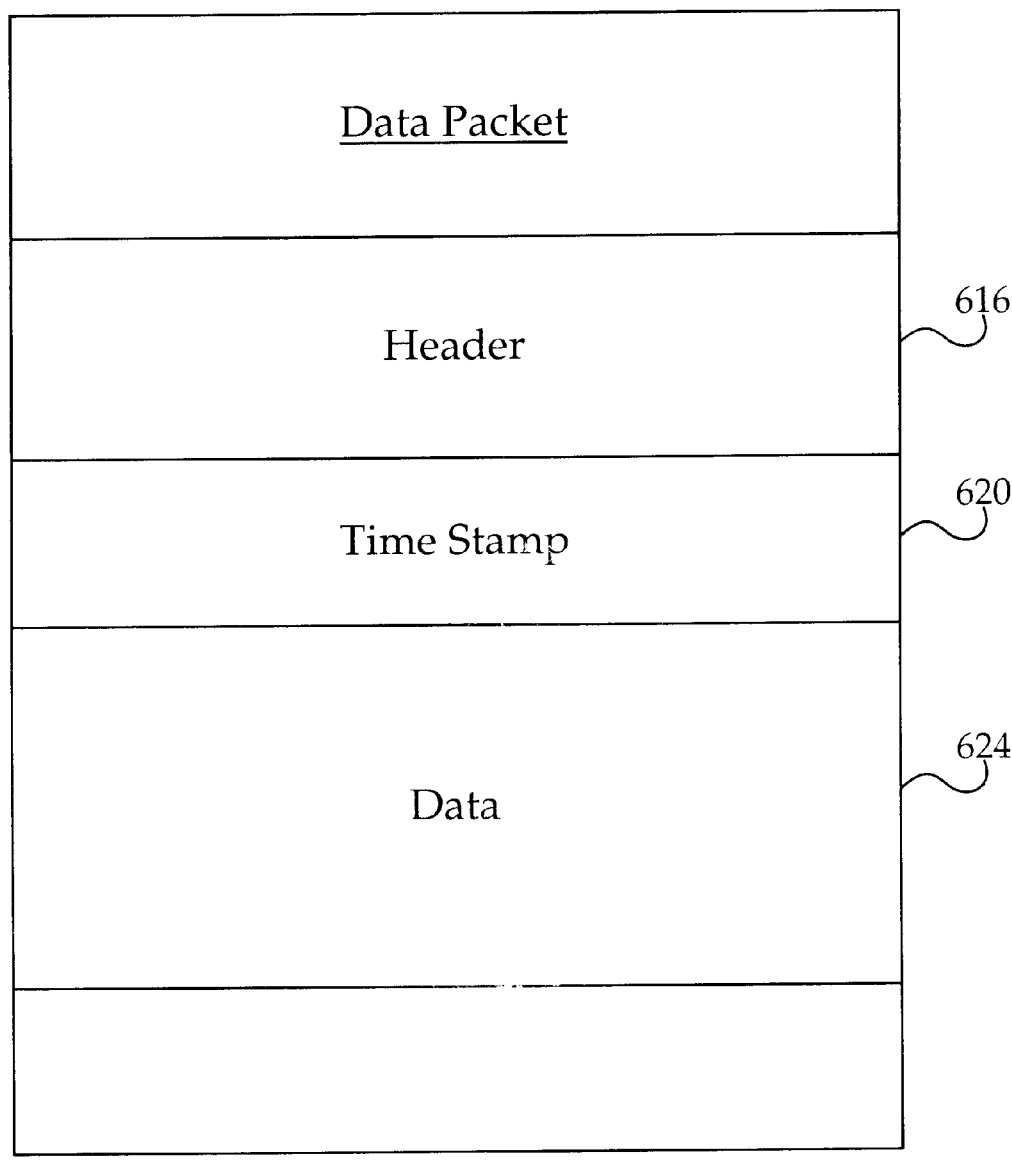
FIG. 6 is a block diagram for one embodiment of a data packet, in accordance with the present invention.

Referring now to FIG. 6, a block diagram for one embodiment of a data packet 612 is shown, in accordance with the present invention. In the FIG. 6 embodiment, data packet 612 includes, but is not limited to, a header 616, a time stamp 620, and data 624. In alternate embodiments, data packet 612 may readily comprise various other configurations that include information in addition to, or instead of, that discussed in conjunction with the FIG. 6 embodiment.

In the FIG. 6 embodiment, header 616 preferably includes various relevant information related to data packet 612. Data 624 preferably may include various types of isochronous or other data for use in interconnect 110. Time stamp 620 comprises a presentation specification that preferably includes information to specify the isochronous cycle during which the corresponding data 624 is to be utilized by a listener 150 on interconnect 110. In certain embodiments, time stamp 620 preferably includes a cycle value to identify a particular position within a specific cycle (for example, 19.0 or 21.5). Data packets are further discussed in an IEC 61883 specification entitled "Digital Interface For Consumer Audio/Video Equipment, Parts 1-4, 1997, which is hereby incorporated by reference. The utilization and handling of data packet 612 is further discussed below in conjunction FIGS. 1, 8, and 9.

Figure 7:
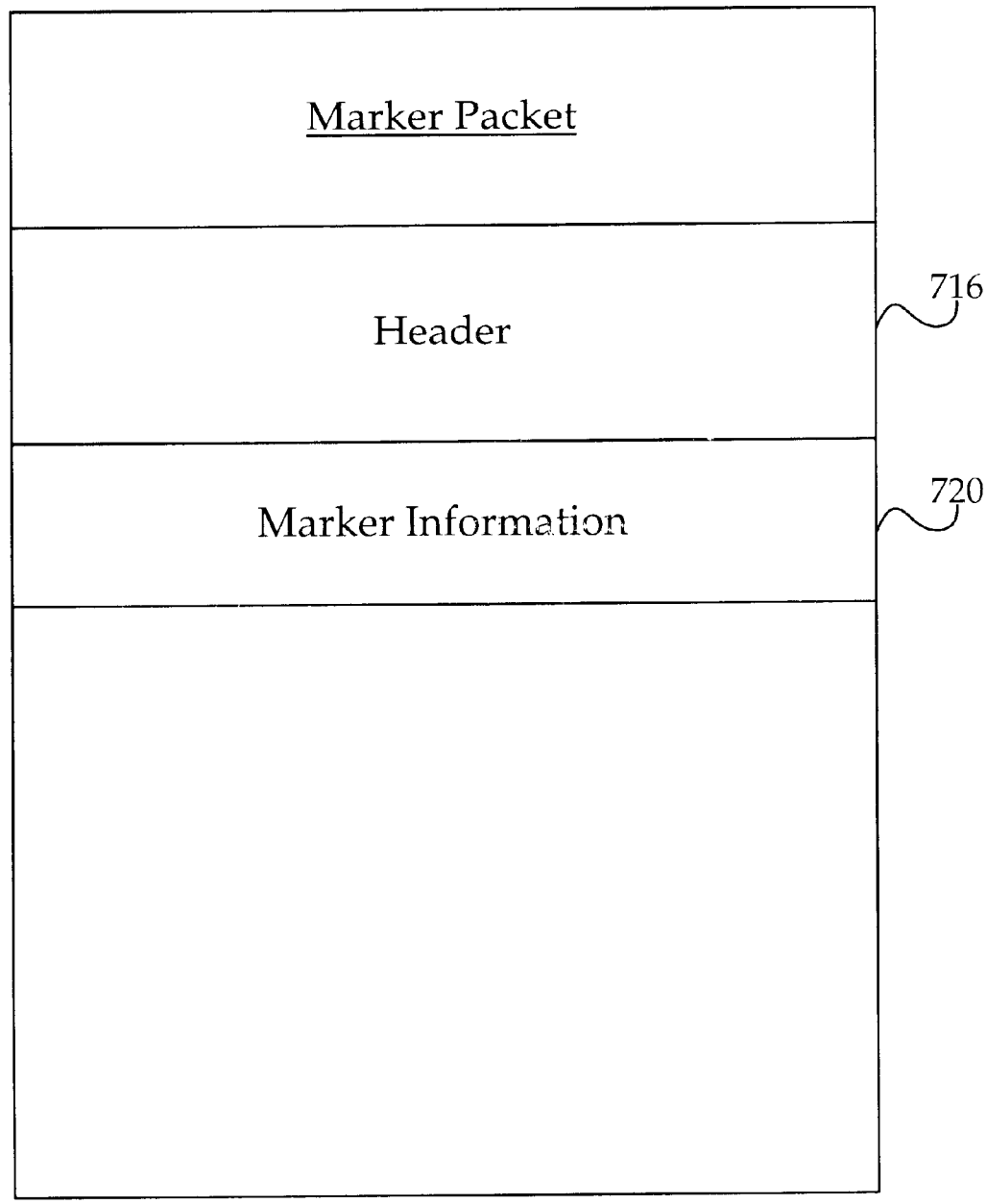
FIG. 7 is a block diagram for one embodiment of a marker packet, in accordance with the present invention.

Referring now to FIG. 7, a block diagram for one embodiment of a marker packet 712 is shown, in accordance with the present invention. In the FIG. 7 embodiment, marker packet 712 includes, but is not limited to, a header 716 and marker information 720. In alternate embodiments, marker packet 712 may readily comprise various other configurations that include information in addition to, or instead of, that discussed in conjunction with the FIG. 7 embodiment.

In the FIG. 7 embodiment, header 716 preferably includes various relevant information related to marker packet 712. Marker information 720 preferably includes information that may be utilized to effectively deliver one or more data packets 612 from a talker 114 to a listener 150, in accordance with the present invention. The utilization and handling of marker packet 712 is further discussed below in conjunction FIGS. 1, 8, and 9.

Referring again to FIG. 1, the present invention comprises a technique for effectively delivering data packets from a talker to a listener through one or more delay elements A talker preferably includes any source device or node that is coupled to interconnect 110 to broadcast a transmission of information to a listener on interconnect 110. A listener preferably includes any destination device or node that is coupled to interconnect 110 to receive a transmission of information from a talker. In certain embodiments, the talker preferably inserts a time stamp to accurately designate a specific position in a particular isochronous cycle during which the corresponding packet data is to be presented for use by the listener. The foregoing timestamp may be calculated to ensure that processes and conditions related to the received data packet are in a stable state, and that the listener is ready to utilize the particular data packet.

However, in interconnects with multiple busses, bus bridges and other delay elements are typically required to facilitate communication between the various busses. As discussed above in conjunction with FIG. 5, bridges typically create delay in transmissions that are propagated from one bus to an adjacent bus. Depending upon the particular topology of a given interconnect, the foregoing time stamp 620 may need to be recalculated to account for each delay element in the transmission path, in order for the time stamp 620 that ultimately reaches the listener 150 to accurately incorporate the propagation delay present in the transmission path. The present invention is also contemplated for use to compensate for sources of timing error other than those caused by bus bridges, and may therefore advantageously be utilized to compensate for various delay elements in any system configuration.

The FIG. 1 embodiment is utilized below to present an example of one application of the present invention. Any actual embodiment of the present invention is substantially dependent upon the topology and implementation of interconnect 110, and therefore the following example is presented only to discuss and illustrate various principles of the present invention In this FIG. 1 example, connection manager 314 of controller 118 preferably initially communicates with various devices on interconnect 110 to set-up and control a transmission of one or more isochronous data packets 612 across interconnect 110. As discussed above in conjunction with FIG. 3, talker 114 preferably creates a time stamp 620 corresponding to a data packet 612, and then transmits the data packet 612 and the time stamp 620 to an initial bridge A 126.

As discussed above, bridge A 126 typically adds finite delay to the transmission path of data packet 612. Instead of performing a time-consuming recalculation of time stamp 620 in the FIG. 1 embodiment, timestamp handler 460 in bridge A 126 preferably performs an initial packet handling procedure by creating a marker packet 712 that is preferably transmitted along the same transmission path as the foregoing one or more data packets 612. In alternate embodiments, market packet 712 may be created using any other effective technique. For example, connection manager 314 or time stamper 320 in talker 114 may readily create and transmit marker packet 712. The marker information 720 in marker packet 712 may include any relevant information to determine the total transmission-path delay, which may then be utilized to perform a single efficient time-stamp recalculation process at a final delay element in the transmission path (here, bridge C 142).

In a synchronized embodiment of the present invention, all busses of interconnect 110 are referenced to a single reference source so that corresponding isochronous cycles on each bus have the same cycle numbers. In the synchronized embodiment, marker information 720 may include information to specify the transmission cycle during which the corresponding data packet 612 was transmitted from talker 114. At the final delay element (here, bridge C 142), the total transmission path delay may then readily be determined by subtracting the foregoing transmission cycle from a reception cycle in which the data packet is received by listener 150.

In a non-synchronized embodiment of the present invention, all busses of interconnect 110 are not referenced to a single reference source, and corresponding isochronous cycles on each bus may have different cycle numbers. In the non-synchronized embodiment, marker information 720 preferably may comprise other information to compensate for the different bus synchronization references, including information regarding the current cumulative transmission path delay.

In one embodiment of the non-synchronized interconnect 110, each delay element preferably may recalculate marker information 720 in marker packet 712 according to the following formula:

$$\text{Marker} = (\text{Output Bus Cycle} - \text{Input Bus Cycle}) + \text{Delay}$$

where Marker is marker information 720, Output Bus Cycle is the current cycle number of a target bus (here, bus B 130), Input Bus Cycle is the current cycle number of a source bus (here, bus A 122), and Delay is the current cumulative transmission-path delay, including the current delay element (here, bridge A 126).

After the creation of marker packet 712, bridge A 126 preferably transmits data packet 612 and marker packet 712 to intermediate bridge B 134 via bus B 130 for intermediate packet handling procedures. In response, timestamp handler A 460 of bridge B 134 preferably handles marker information 720 of marker packet 712 depending on whether the busses on interconnect 110 are synchronized or non-synchronized, as discussed above. If interconnect 110 is synchronized, then marker information 720 requires no updating, and marker packet 712 may efficiently be transmitted intact to final bridge C 142. However, if interconnect 110 is non-synchronized, then timestamp handler A 460 preferably updates marker information 720, as discussed above, before transmitting marker packet 712 to bridge C 142. In accordance with the present invention, the time stamp 620 of data packet 612 advantageously need not be recalculated at this point, and data packet 612 may be efficiently transmitted to bridge C 142.

In response, final bridge C 142 preferably performs packet handling procedures that are similar to those performed above by intermediate bridge B 134 to update marker information 720 when appropriate. Bridge C 142 then may perform a final packet handling procedure by preferably determining a total transmission-path delay value that is based on the final version of marker information 720. Finally, bridge C 142 preferably recalculates time stamp 620 to produce an adjusted time stamp value by adding the total transmission-path delay value to the original time stamp 620. Listener 150 may then accurately access and utilize the data 624 from data packet 612 precisely at the moment indicated by the adjusted time stamp value, in accordance with the present invention.

The foregoing FIG. 1 example is presented in the context of four busses that are connected by a three bridges, where the data transmission is between a single talker and a single listener. However, the present invention is contemplated for use in interconnects comprising any desired number of busses, talkers, and/or listeners that are configured in any desired manner. In addition, the foregoing handling procedures may be performed using any suitable handler means, including various combinations of software and/or hardware implementations.

Figure 8:
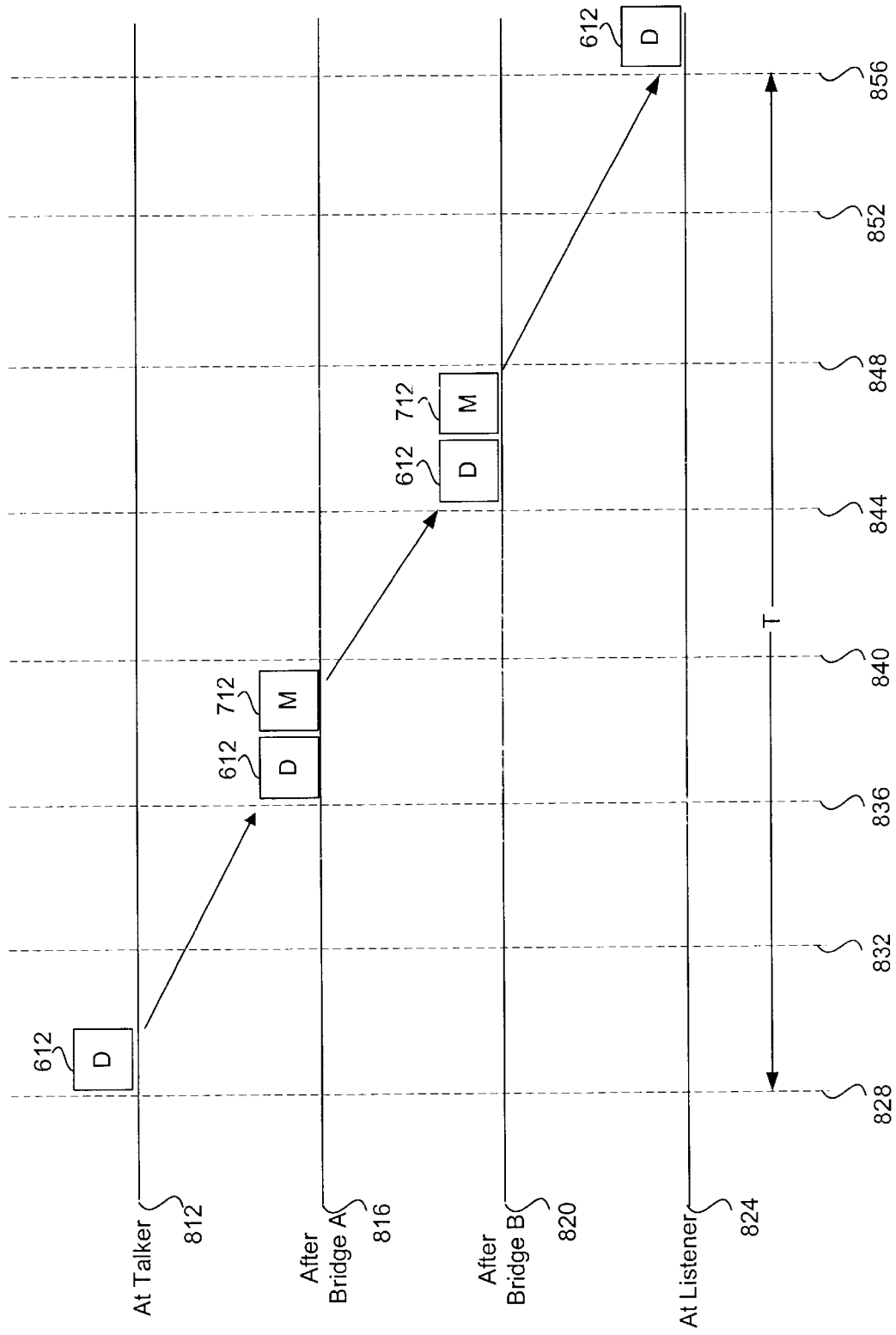
FIG. 8 is a timing diagram illustrating a transmission from a talker to a listener, in accordance with one embodiment of the present invention.

Referring now to FIG. 8, a timing diagram illustrating a transmission from a talker 114 to a listener 150 is shown, in accordance with one embodiment of the present invention. The timing diagram of FIG. 8 is presented for purposes of illustrating certain principles of the present invention in the context of the FIG. 1 embodiment. In alternate embodiments, the present invention may readily function with various waveforms and timing diagrams other than those discussed in conjunction with the FIG. 8 embodiment. In the FIG. 8 embodiment, regularly-occurring cycle starts for each of the respective isochronous cycles are shown at times 828 through 856.

In the FIG. 8 embodiment, a waveform 812 from bus A 122 is shown to depict a transmission of a data packet 612 from talker 114 during the cycle beginning at time 828. In the FIG. 8 embodiment, a waveform 816 from bus B 130 similarly depicts the foregoing data packet 612 during the cycle beginning at time 836 after bridge A 126 has inserted a finite delay (here, two cycles). In accordance with the present invention, a marker packet 712 is also created and transmitted during the cycle which begins at time 836.

In the FIG. 8 embodiment, a waveform 820 from bus C 138 depicts the foregoing data packet 612 and the corresponding marker packet 712 during the cycle beginning at time 844 after bridge C 142 has inserted a finite delay (here, two cycles). Finally, in the FIG. 8 embodiment, a waveform 824 depicts the foregoing data packet 612 at its presentation to listener 150 during the cycle beginning at time 856 after bridge C 142 has inserted a finite delay (here, two cycles).

In accordance with the present invention, the time stamp 620 in data packet 612 may advantageously be recalculated to incorporate the total delay "T" from transmission by talker 114 (during the cycle beginning at time 828) until presentation for use by listener 150 (during the cycle beginning at time 856). In certain embodiments of the present invention, a single marker packet 712 may be utilized to recalculate time stamps 620 for a plurality of related data packets 612. In addition, interconnect 110 may also utilize marker information 720 or other included information in marker packet 712 in any other appropriate manner.

Figure 9:
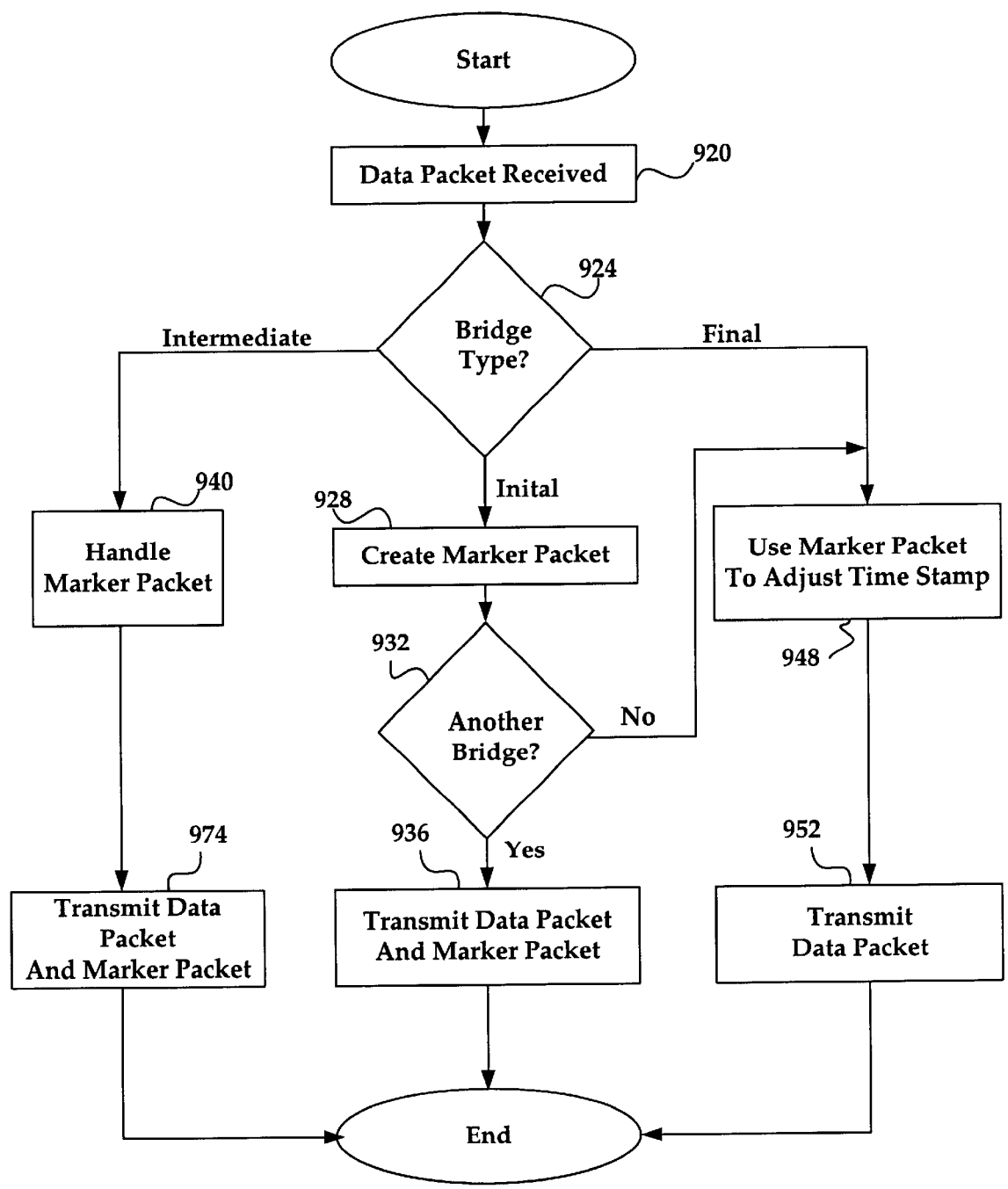
FIG. 9 is a flowchart of method steps for handling a data packet with a bus bridge, in accordance with one embodiment of the present invention.

Referring now to FIG. 9, a flowchart of method steps for handling a data packet 612 with a bus bridge is shown, in accordance with one embodiment of the present invention. In alternate embodiments, the present invention may be successfully implemented with method steps that follow an altered sequence, or include steps that are different from, or in addition to, those discussed in conjunction with the FIG. 9 embodiment.

In the FIG. 9 embodiment, initially, in step 920, a delay element such as a current bus bridge (for example, bridges 126, 134, 142 of the FIG. 1 embodiment) receives one or more data packets 612 from an upstream source in a transmission path of the one or more data packets 612. In step 924, the foregoing current bus bridge reacts depending upon its particular bridge type (based on its sequential position in the transmission path).

If the current bus bridge is an initial bridge (for example, bridge A 126) in the transmission path of the data packet 612, then, in step 928, the current bus bridge (or other appropriate entity) creates a marker packet 928 corresponding to the data packet 612. Then, in step 932, the current bus bridge determines whether another bridge remains in the transmission path. If no additional bridges remain, then the FIG. 9 process advances to step 948. However, if additional bridges remain in the transmission path of data packet 612, then, in step 936, the current bus bridge preferably propagates data packet 612 and marker packet 712 along the transmission path to the next bus bridge or other delay element.

However, in foregoing step 924, if the current bus bridge is an intermediate bridge (such as bridge B 134) in the transmission path of the data packet 612, then, in step 940, the current bus bridge (or other appropriate entity) handles marker packet 928 as discussed above in conjunction with FIG. 1. Then, in step 974, the current bus bridge preferably propagates data packet 612 and marker packet 712 along the transmission path to the next bus bridge or other delay element.

In addition, in foregoing step 924, if the current bus bridge is a final bridge (such as bridge C 142) in the transmission path of the data packet 612, then, in step 948, the current bus bridge utilizes marker information 720 in marker packet 928 to recalculate time stamp 620, as discussed above in conjunction with FIG. 1. Finally, in step 952, the current bus bridge preferably propagates data packet 612 to listener 150 for effective utilization during the particular isochronous cycle specified in the recalculated time stamp 620.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for delivering information, comprising:
   a transmission path for transmitting a data packet that includes a presentation specification;
   a marker packet that includes delay information and is propagated through said transmission path; and
   one or more handlers configured to utilize said marker packet for updating said presentation specification by recalculating a time stamp in said presentation specification.

2. The system of claim 1 wherein said transmission path is part of an electronic interconnect that is implemented according to an IEEE Std 1394 serial bus interconnectivity standard.

3. The system of claim 1 wherein said data packet includes isochronous data that is referenced to isochronous cycles, and which is propagated from a talker device to a listener device based on instructions from a connection manager in a controller device.

4. The system of claim 1 wherein any of said controller, said talker, and said listener is one of a consumer-electronics device, an audio-visual device, a set-top box device, and a personal computer device.

5. The system of claim 1 wherein said marker packet includes said delay information corresponding to delay elements in said transmission path, and wherein said one or more handlers comprises a final delay element that utilizes said delay information to recalculate said time stamp in said presentation specification to thereby specify when said data packet is presented for use by a listener device in an electronic interconnect.

6. The system of claim 1 wherein a talker device in an electronic interconnect transmits said data packet and a time stamp on said transmission path to a listener device through one or more bus bridges that each couple adjacent busses in said electronic interconnect, said one or more bus bridges each having a finite propagation delay.

7. The system of claim 6 wherein said talker device includes a time stamper for creating said time stamp, a talker FIFO memory for temporarily storing said data packet, and a cycle gate for transmitting said data packet onto said transmission path in accordance with a transmission time in said time stamp.

8. The system of claim 6 wherein said listener device includes a listener FIFO memory for temporarily storing said data packet, and a time stamp gate for presenting said data packet for use by said listener device in accordance with a presentation time in said time stamp.

9. The system of claim 6 wherein said one or more bus bridges each include a channel recognizer for routing said data packet, buffers for temporarily storing said data packet, and a time stamp handler for manipulating said time stamp and said marker packet.

10. The system of claim 6 wherein said one or more bus bridges includes an initial bridge for creating said marker packet, and for transmitting said marker packet and said data packet along said transmission path.

11. The system of claim 10 wherein all busses of said electronic interconnect are synchronized, and wherein marker information in said marker packet includes a transmit cycle that indicates when said data packet is transmitted from said talker device.

12. The system of claim 10 wherein all busses of said electronic interconnect are not synchronized, and wherein marker information in said marker packet includes a cumulative delay value that is defined by a following formula:

Marker=(Output Bus Cycle−Input Bus Cycle)+Delay where Marker is said cumulative delay value, Output Bus Cycle is a current cycle number of a target bus, Input Bus Cycle is a current cycle number of a source bus, and Delay is a current cumulative transmission-path delay.

13. The system of claim 6 wherein said one or more bus bridges includes an intermediate bridge for handling said marker packet, and for transmitting said marker packet and said data packet along said transmission path.

14. The system of claim 13 wherein all busses of said electronic interconnect are synchronized, and wherein said intermediate bridge does not alter marker information in said marker packet.

15. The system of claim 13 wherein all busses of said electronic interconnect are not synchronized, and wherein said intermediate bridge updates a cumulative delay value in marker information of said marker packet according to a following formula:

Marker=(Output Bus Cycle−Input Bus Cycle)+Delay where Marker is said cumulative delay value, Output Bus Cycle is a current cycle number of a target bus, Input Bus Cycle is a current cycle number of a source bus, and Delay is a current cumulative transmission-path delay.

16. The system of claim 6 wherein said one or more bus bridges includes a final bridge for utilizing said marker packet to update said time stamp, and transmitting said data packet to said listener device.

17. The system of claim 16 wherein all busses of said electronic interconnect are synchronized, and wherein said final bridge subtracts a talker transmission time in said marker packet from a listener reception time to produce a total delay time corresponding to said transmission path.

18. The system of claim 16 wherein all busses of said electronic interconnect are not synchronized, and wherein said final bridge updates a cumulative delay value in marker information of said marker packet to include a delay from said final bridge, said cumulative delay value then being equal to a total delay time corresponding to said transmission path.

19. The system of claim 17 wherein said final bridge performs a timestamp recalculation procedure by adding said total delay time to a presentation time in said time stamp to produce an adjusted presentation time, said listener device accessing and utilizing said data packet at said adjusted presentation time.

20. The system of claim 18 wherein said final bridge performs a timestamp recalculation procedure by adding said total delay time to a presentation time in said time stamp to produce an adjusted presentation time, said listener device accessing and utilizing said data packet at said adjusted presentation time.

21. A method for delivering information, comprising the steps of:

transmitting a data packet that includes a presentation specification along a transmission path;

propagating a marker packet that includes delay information through said transmission path; and updating said presentation specification with one or more handlers by utilizing said marker packet to recalculate a time stamp in said presentation specification.

22. The method of claim 21 wherein said transmission path is part of an electronic interconnect that is implemented according to an IEEE Std 1394 serial bus interconnectivity standard.

23. The method of claim 21 wherein said data packet includes isochronous data that is referenced to isochronous cycles, and which is propagated from a talker device to a listener device based on instructions from a connection manager in a controller device.

24. The method of claim 21 wherein any of said controller, said talker, and said listener is one of a consumer-electronics device, an audio-visual device, a set-top box device, and a personal computer device.

25. The method of claim 21 wherein said marker packet includes said delay information corresponding to delay elements in said transmission path, and wherein said one or more handlers comprises a final delay element that utilizes said delay information to recalculate said time stamp in said presentation specification to thereby specify when said data packet is presented for use by a listener device in an electronic interconnect.

26. The method of claim 21 wherein a talker device in an electronic interconnect transmits said data packet and a time stamp on said transmission path to a listener device through one or more bus bridges that each couple adjacent busses in said electronic interconnect, said one or more bus bridges each having a finite propagation delay.

27. The method of claim 26 wherein said talker device includes a time stamper for creating said time stamp, a talker FIFO memory for temporarily storing said data packet, and a cycle gate for transmitting said data packet onto said transmission path in accordance with a transmission time in said time stamp.

28. The method of claim 26 wherein said listener device includes a listener FIFO memory for temporarily storing said data packet, and a time stamp gate for presenting said data packet for use by said listener device in accordance with a presentation time in said time stamp.

29. The method of claim 26 wherein said one or more bus bridges each include a channel recognizer for routing said data packet, buffers for temporarily storing said data packet, and a time stamp handler for manipulating said time stamp and said marker packet.

30. The method of claim 26 wherein said one or more bus bridges includes an initial bridge for creating said marker packet, and for transmitting said marker packet and said data packet along said transmission path.

31. The method of claim 30 wherein all busses of said electronic interconnect are synchronized, and wherein marker information in said marker packet includes a transmit cycle that indicates when said data packet is transmitted from said talker device.

32. The method of claim 30 wherein all busses of said electronic interconnect are not synchronized, and wherein marker information in said marker packet includes a cumulative delay value that is defined by a following formula:

Marker=(Output Bus Cycle−Input Bus Cycle)+Delay where Marker is said cumulative delay value, Output Bus Cycle is a current cycle number of a target bus, Input Bus Cycle is a current cycle number of a source bus, and Delay is a current cumulative transmission-path delay.

33. The method of claim 26 wherein said one or more bus bridges includes an intermediate bridge for handling said marker packet, and for transmitting said marker packet and said data packet along said transmission path.

34. The method of claim 33 wherein all busses of said electronic interconnect are synchronized, and wherein said intermediate bridge does not alter marker information in said marker packet.

35. The method of claim 33 wherein all busses of said electronic interconnect are not synchronized, and wherein said intermediate bridge updates a cumulative delay value in marker information of said marker packet according to a following formula:

Marker=(Output Bus Cycle−Input Bus Cycle)+Delay where Marker is said cumulative delay value, Output Bus Cycle is a current cycle number of a target bus, Input Bus Cycle is a current cycle number of a source bus, and Delay is a current cumulative transmission-path delay.

36. The method of claim 26 wherein said one or more bus bridges includes a final bridge for utilizing said marker packet to update said time stamp, and transmitting said data packet to said listener device.

37. The method of claim 36 wherein all busses of said electronic interconnect are synchronized, and wherein said final bridge subtracts a talker transmission time in said marker packet from a listener reception time to produce a total delay time corresponding to said transmission path.

38. The method of claim 36 wherein all busses of said electronic interconnect are not synchronized, and wherein said final bridge updates a cumulative delay value in marker information of said marker packet to include a delay from said final bridge, said cumulative delay value then being equal to a total delay time corresponding to said transmission path.

39. The method of claim 37 wherein said final bridge performs a timestamp recalculation procedure by adding said total delay time to a presentation time in said time stamp to produce an adjusted presentation time, said listener device accessing and utilizing said data packet at said adjusted presentation time.

40. The method of claim 38 wherein said final bridge performs a timestamp recalculation procedure by adding said total delay time to a presentation time in said time stamp to produce an adjusted presentation time, said listener device accessing and utilizing said data packet at said adjusted presentation time.

41. A computer-readable medium containing program instructions for delivering information by performing the steps of:

transmitting a data packet that includes a presentation specification along a transmission path;

propagating a marker packet that includes delay information through said transmission path; and updating said presentation specification with one or more handlers by utilizing said marker packet to recalculate a time stamp in said presentation specification.

42. A system for delivering information, comprising:

means for transmitting a data packet that includes a presentation specification along a transmission path;

means for propagating a marker packet through said transmission path; and means for updating said presentation specification by utilizing said marker packet.

* * * * *